United States Patent

Koyama et al.

[11] 3,855,245
[45] Dec. 17, 1974

[54] PROCESS FOR THE MANUFACTURE OF DERIVATIVES OF BETA-PHENYLPYRUVIC ACID

[75] Inventors: Hiroyasu Koyama, Tokyo; Kunio Nakagawa, Kawagoe, both of Japan

[73] Assignee: Nisshin Flour Milling Co., Ltd., Tokyo, Japan

[22] Filed: May 23, 1972

[21] Appl. No.: 256,118

[30] Foreign Application Priority Data
June 16, 1971 Japan.................................. 46-42575

[52] U.S. Cl............................... 260/340.5, 260/521
[51] Int. Cl............................................ C07d 13/10
[58] Field of Search........................ 260/340.5, 521

[56] References Cited
UNITED STATES PATENTS 3,655,695  4/1972  Andrews.......................... 260/340.5
3,772,378  11/1973  Houlihan......................... 260/340.5

OTHER PUBLICATIONS

Blanchard, et al., "Chemical Abstracts," Vol. 59 (1963) Col. 531 g.
Oku, et al., "Chemical Abstracts," Vol. 63 (1965), Col. 9895 h.

*Primary Examiner*—Joseph A. Narcavage
*Assistant Examiner*—James H. Turnipseed
*Attorney, Agent, or Firm*—Mason, Fenwick & Lawrence

[57] ABSTRACT

A process for the manufacture of derivatives of β-phenyl pyruvic acid represented by the general formula:

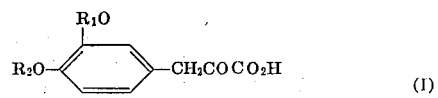

(I)

wherein $R_1$ and $R_2$ are same or are different and each is a lower alkyl group or $R_1$ and $R_2$ together may form a methylene group, characterized in that β-phenyl glycidic ester represented by the genreal formula:

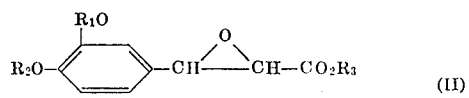

(II)

wherein $R_1$ and $R_2$ have the same meanings as above and $R_3$ stands for a lower alkyl group are rearranged by an anhydrous acid to form β-phenyl pyruvic ester represented by the general formula:

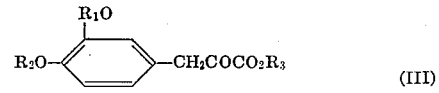

(III)

wherein $R_1$, $R_2$ and $R_3$ have the same meanings as above and then the β-phenyl pyruvic ester is hydrolyzed by a mineral acid to give the derivatives of β-phenyl pyruvic acid.

8 Claims, No Drawings

PROCESS FOR THE MANUFACTURE OF DERIVATIVES OF BETA-PHENYLPYRUVIC ACID

The present invention relates to a process for the manufacture of derivatives of β-phenylpyruvic acid, more particularly a process for the manufacture of derivatives of β-phenylpyruvic acid represented by the general formula:

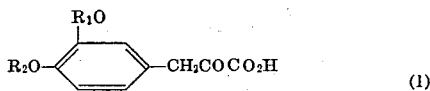

(I)

wherein $R_1$ and $R_2$ are same or are different and each is a lower alkyl group or $R_1$ and $R_2$ together may form a methylene group.

The derivatives of β-phenylpyruvic acid represented by the formula (I) is an important intermediate for the preparation of a pharmaceutical agent such as β-3,4-dioxyphenyl-L-alanine (hereinafter referred to as "L-dopa") which is a remarkable therapeutic agent for Parkinson's disease.

As the process for the manufacture of derivatives of β-phenylpyruvic acid represented by the formula (I), hithertobefore, there are proposed a process wherein azlactone of α-benzoylamino-β-3,4-dimethoxyphenyl acrylic acid is hydrolyzed with an aqueous sodium hydroxide solution to obtain β-3,4-dimethoxyphenyl pyruvic acid, (A.H. Blatt: "Organic Synthesis" Collective Vol. 2, page 333, published by John Wiley & Sons Inc.) However, this process has the disadvantage that the separation of the formed β-3,4-dimethoxyphenyl pyruvic acid from benzoic acid is very complicated.

As a result of various investigations for the manufacture of derivatives of β-phenylpyruvic acid represented by the formula (I), it has now been found that when β-phenyl glycidic ester represented by the general formula:

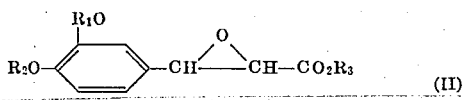

(II)

wherein $R_1$ and $R_2$ are same or different and each is a lower alkyl group or $R_1$ and $R_2$ together may form a methylene group and $R_3$ stands for a lower alkyl group are rearranged by an anhydrous acid to form β-phenyl pyruvic ester represented by the general formula:

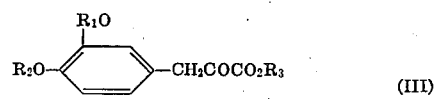

(III)

wherein $R_1$, $R_2$ and $R_3$ have same meanings as above and then the β-phenyl pyruvic ester is hydrolyzed by a mineral acid, the derivatives of β-phenyl pyruvic acid represented by the formula (I) can be obtained in an easier operation and also in a higher yield than the above mentioned prior art.

According to the present invention, therefore, there is provided a process for the manufacture of derivatives of β-phenyl pyruvic acid represented by the general formula:

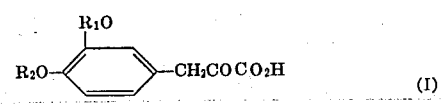

(I)

wherein $R_1$ and $R_2$ are same or are different and each is a lower alkyl group or $R_1$ and $R_2$ together may form a methylene group, characterized in that β-phenyl glycidic ester represented by the general formula:

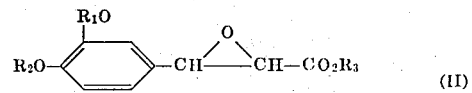

(II)

wherein $R_1$ and $R_2$ have same meanings as above and $R_3$ stands for a lower alkyl group are rearranged by an anhydrous acid to form β-phenyl pyruvic ester represented by the general formula:

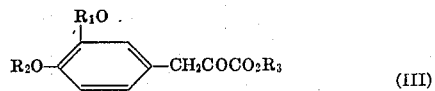

(III)

wherein $R_1$, $R_2$ and $R_3$ have same meanings as above and then the β-phenyl pyruvic ester is hydrolyzed by a mineral acid to give the derivatives of β-phenyl pyruvic acid.

The starting material, β-phenyl glycidic ester represented by the formula (II) which may be used according to the present invention can be obtained by known methods. For example, there are proposed a process for the manufacture of β-3,4-dimethoxyphenyl glycidic methyl ester wherein 3,4-dimethoxybenzaldehyde (veratryl aldehyde) is reacted with methyl chloroacetate by Darzen reaction.

In the practice of the process of the present invention, various acids can be used for obtaining the compound represented by the formula (III) from the compound represented by the formula (II), but in any case it is necessary to keep these acids in an anhydrous state. When anhydrous mineral acids such as anhydrous hydrogen chloride or sulfuric acid are used as said acid, if the reaction is carried out in absence of solvent, the yield of the product can be increased and that the operation can be simplified because the subsequent hydrolysis reaction can be carried out in the same reaction vessel for the rearranging reaction. When the reaction is carried out in the absence of solvent, if the compound represented by the formula (II) is solid, it is necessary to carry out the reaction in a liquid state by the heat-melting of it. If the compound represented by the formula (II) is liquid it is preferable to carry out the reaction for example at a temperature of about 100°C. under a heating because the reaction velocity can be increased. Thus, the reaction can be completed when the compound represented by the formula (II) is heated to about 100°C. or if necessary, at high temperature with an agitation for about 15 minutes by the introduction of anhydrous hydrogen chloride gas through the reaction liquid or by the addition of sulfuric acid in the quantity of several droplets per 10 g. of the compound represented by the formula (II) to the reaction liquid. When the reaction liquid is maintained at room temperature the crystal of the compound represented by the formula (III) can be obtained in practically pure state. Therefore, the subsequent hydrolysis reaction can be carried out in the same reaction vessel.

When Lewis acid such as boron trifluoride etherate is used as the acid, the reaction may be carried out by dissolving the compound represented by the formula (II) into non-protonic solvents. At that time, it is especially preferable to use dimethyl formamide or dimethyl sulfoxide as the solvent in viewpoints of purity and yield of the reaction product.

The reaction may be completed by dissolving the compound represented by the formula (II) into about 3 to 4 times quantity of solvent, then by adding tenth to one-half quantity of boron trifluoride ethearate to the solution and by agitating the solution and then allowing to stand the solution at room temperature for about 1 hour. When the reaction liquid is poured into about 10 times quantity of water, the compound represented by the formula (III) is obtained as a white crystal. This crystal is practically sufficient pure and thus can be used for the subsequent reaction without additional purification.

In order to obtain the compound represented by the formula (I) from the compound represented by the formula (III), the compound represented by the formula (III) is heated at a temperature of about 100°C. for about 15 minutes together with about 10 times quantity of mineral acid, preferably concentrated hydrochloric acid. When the compound represented by the formula (III) is slightly soluble in the above case, the reaction may be smoothly proceeded by using glacial acetic acid as the solvent in a suitable quantity. As the reaction is proceeded the crystal of the compound represented by the formula (I) is precipitated. After the completion of the reaction the precipitated compound represented by the formula (I) is filtered and dried to give a practically sufficient pure one. If necessary, the obtained compound is recrystallized from glacial acetic acid to be able to give a chemically pure compound.

The present invention is illustrated by the following examples which are not intended to limit the scope of the present invention.

EXAMPLE 1

10 g. of methyl β-3,4-dimethoxyphenyl glycidate were melted with a heating at a temperature of about 100°C. and then was gradually introduced with a dry hydrogen chloride gas.

The reaction was completed after about 15 minutes to obtain methyl β-3,4-dimethoxyphenyl pyruvate. When the methyl β-3,4-dimethoxyphenyl pyruvate melted at about 100°C., 100 ml. of concentrated hydrochloric acid was added and agitated, the former was once dissolved into the latter, but a crystal was soon precipitated. After about 15 minutes heating and agitating, the reaction mixture was cooled with ice water for 30 minutes and the crystal was filtered off. The obtained crystal was well washed with water and then dried on phosphorus pentoxide under a reduced pressure to obtain 7.5 g. of β-3,4-dimethoxyphenyl pyruvic acid. (Theoretical yield: 80%). Although this product was practically sufficient pure, a chemically pure crystal can be obtained by further recrystallization from glacial acetic acid.

| Analysis: | C | H |
|---|---|---|
| Calcd. for $C_{11}H_{12}O_5$: | 58.92% | 5.40% |
| Found: | 59.32% | 5.39% |

EXAMPLE 2

10 g. of methyl β-3,4-dimethoxyphenyl glycidate were melted with a heating at a temperature of about 100°C. and then was added with several droplets of concentrated sulfuric acid with an agitation. The reaction was completed after further 15 minutes agitation to give methyl β-3,4-dimethoxyphenyl pyruvate.

By the same operation as described in Example 1, subsequently, 7.0 g. of β-3,4-dimethoxyphenyl pyruvic acid were obtained (Theoretical yield: 74%).

EXAMPLE 3

10 g. of methyl β-3,4-dimethoxyphenyl glycidate were dissolved in 35 ml. of anhydrous dimethyl sulfoxide and the solution was added with 5 ml. of boron trifluoride etherate with an agitation and then kept to stand for 2 hours at room temperature. When the reaction solution was poured into 500 ml. of water with an agitation a white crystal was precipitated. After the agitation was carried out for about 15 minutes, the crystal was filtered off. The crystal was well washed with water and dried on phosphorus pentoxide under a reduced pressure to obtain 8.5 g. of methyl β-3,4-dimethoxyphenyl pyruvate. (Theoretical yield: 85%) This crystal was practically sufficient pure, but when this crystal was recrystallized from benzene/n-hexane mixture a chemically pure crystal having a melting point of 93° to 94°C. can be obtained.

| Analysis: | C | H |
|---|---|---|
| Calcd. for $C_{12}H_{14}O_5$: | 60.50% | 5.92% |
| Found: | 60.49% | 5.88% |

Thus obtained methyl β-3,4-dimethoxyphenyl pyruvate was hydrolyzed with about 100 ml. of concentrated hydrochloric acid by the same operation as described in Example 1 to obtain 7.2 g. of β-3,4-dimethoxyphenyl pyruvic acid. (Theoretical yield: 90%)

EXAMPLE 4

9 g. of Methyl β-3,4-dimethoxyphenyl glycidate were dissolved in 30 ml. of dimethylformamide and the solution was added with 4.5 ml. of boron trifluoride etherate with an agitation and then kept to stand for 2 hours at a room temperature. The reaction solution was poured into 240 ml. of water with stirring to precipitate a white crystal. After the agitation was carried out for about 15 minutes the crystal was filtered off. The crystal was well washed with water and dried on phosphorus pentoxide under a reduced pressure to obtain 6.6 g. of methyl β-3,4-dimethoxyphenyl pyruvate. (Theoretical yield: 73%). This product was hydrolyzed with concentrated hydrochloric acid by the same operation as described in Example 1 to obtain β-3,4-dimethoxyphenyl pyruvic acid.

EXAMPLE 5

10 g. of methyl β-3,4-methylenedioxyphenyl glycidate were melted with a heating at a temperature of about 100°C. and dry hydrogen chloride gas was gradually passed through the melt. After about 15 minutes the reaction was completed to obtain methyl β-3,4-methylenedioxyphenyl pyruvate. This reaction product was dissolved in 20 ml. of glacial acetic acid at a hot state and the solution was poured with 20 ml. of a concentrated hydrochloric acid with an agitation. When the solution was agitated at a temperature of about 100°C. for several minutes a crystal was precipitated. The crystal was filtered off and well washed with water and dried on potassium hydroxide under a reduced pressure to obtain 7.8 g. of β-3,4-methylenedioxyphenyl pyruvic acid. (Theoretical yield: 83%). Although the crystal was practically sufficient pure, a chemically pure crystal was obtained by the further recrystallization of the crystal from glacial acetic acid.

| Analysis: | C | H |
|---|---|---|
| Calcd. for $C_{10}H_8O_5$: | 57.69% | 3.87% |
| Found: | 57.78% | 3.88% |

What we claim is:

1. A process for the manufacture of β-phenyl pyruvic acid represented by the formula:

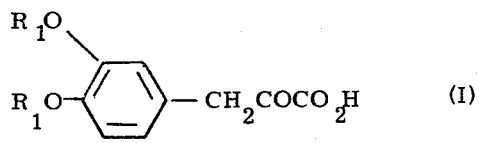 (I)

wherein $R_1$ and $R_2$ are same or are different and each is a lower alkyl having from 1 to 3 carbon atoms or $R_1$ and $R_2$ together may form methylene, characterized in that β-phenyl glicidic ester represented by the formula:

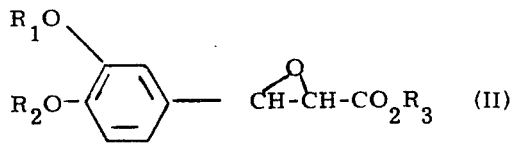 (II)

wherein $R_1$ and $R_2$ have the same meanings as above and $R_3$ stands for lower alkyl are rearranged by an anhydrous acid taken from the group consisting of hydrogen chloride, sulfuric acid, or a Lewis acid to form β-phenyl pyruvic ester represented by the formula:

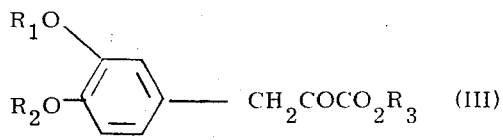 (III)

wherein $R_1$, $R_2$ and $R_3$ have the same meaning as above and then the β-phenyl pyruvic ester is hydrolyzed by a concentrated hydrohalic acid to give the β-phenyl pyruvic acid.

2. The process of claim 1 wherein the rearrangement of the glycidic ester occurs in a solution of a non-protonic solvent.

3. The process of claim 2 wherein the non-protonic solvent is selected from the group of dimethylformamide and dimethyl sulfoxide.

4. The process of claim 3 wherein the anhydrous acid is a Lewis acid.

5. The process of claim 4 wherein the anhydrous acid is boron trifluoride etherate.

6. The process of claim 1 wherein the anhydrous acid is a hydrochloric acid.

7. The process of claim 2 wherein the anhydrous acid is hydrogen chloride or sulfuric acid.

8. The process of claim 1 wherein the temperature of reaction of rearrangement is about 100° C.

* * * * *